United States Patent Office 2,888,398
Patented May 26, 1959

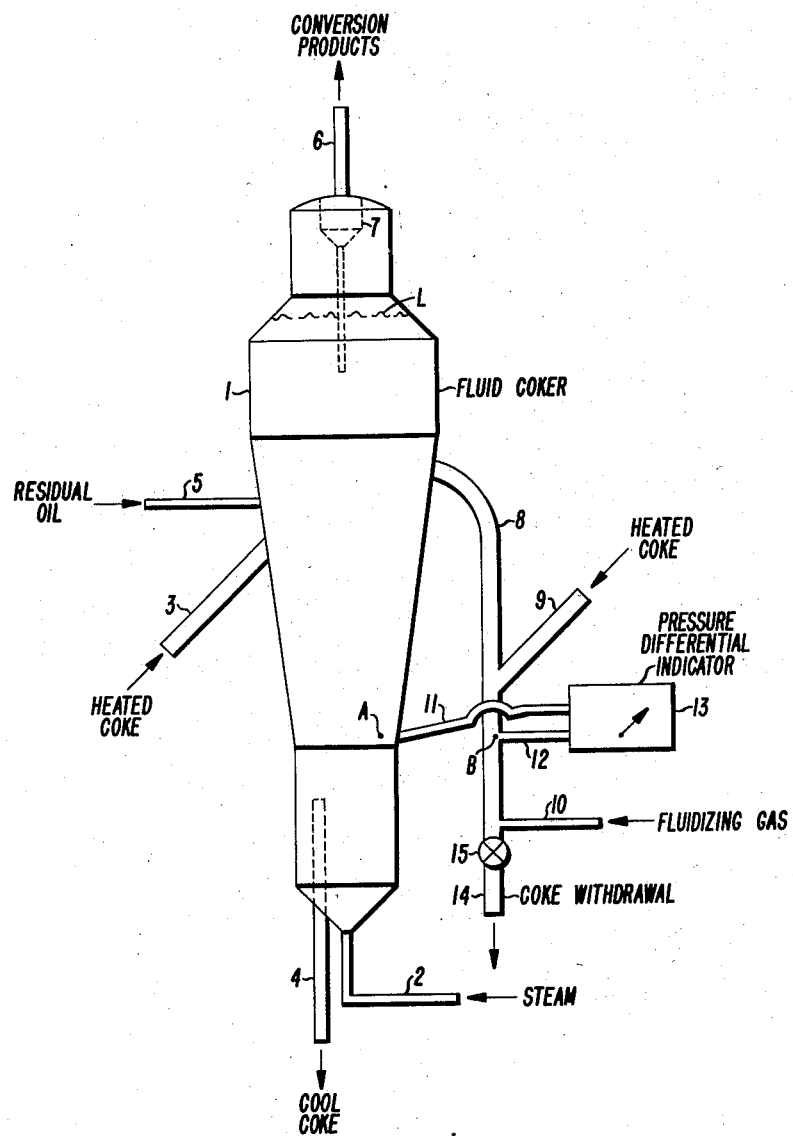

2,888,398

DETERMINATION OF BED FLUIDITY IN FLUID COKERS

Lindsay Ira Griffin, Jr., Baton Rouge, La., assignor to Esso Research and Engineering Company, a corporation of Delaware Application March 25, 1955, Serial No. 496,842

6 Claims. (Cl. 208—157)

The present invention relates to the coking of heavy oils in a fluidized solids system. It relates particularly to a method for controlling the coking reaction whereby maximum feed rates may be enjoyed while bogging or defluidization of the fluid coking bed is prevented.

In essence, this invention provides a method and apparatus for determining incipient bogging conditions in a coking zone whereby proper adjustment can be made of the operating conditions to circumvent bogging and consequent shutdown of the equipment.

A fluid coking process normally consists of a fluid coking vessel and an external heating vessel, e.g., a fluid bed burner. A fluid bed of solids, preferably coke particles produced by the process, is maintained in the coking zone by a fluidizing gas, e.g., steam. The temperature of the bed is maintained at about 950° F. by circulating solids to the heating vessel and back. The heavy oil to be converted is injected into the bed and upon contact with the hot solids undergoes pyrolysis, evolving lighter hydrocarbon vapors and depositing residue or coke on the solids.

The mixing action of the fluid bed normally results in substantially isothermal conditions in the bed and thorough and rapid distribution of the injected heavy oil. Product vapors, after having entrained solids removed, are removed from the coking vessel and sent to scrubber or fractionator for cooling and separation.

A net amount of coke, beyond that burnt to supply heat to the process, is produced. This causes the particles to grow in size unless counteracting measures are taken. A net coke product is withdrawn from the process as product to remove this excess coke. New growth nuclei or seed coke are produced by comminuting a portion of the coke within the process or by externally grinding some of the withdrawn coke and returning it to the process. Because of this growth of the contact solids and addition of seed coke, fluctuations in size and size distribution of the contact solids are experienced.

With the customary feeds to the process, the viscous, near solid components, e.g., asphaltenes, of the feed produce a tacky film on the particle which, until it is coked dry, tends to cause the fluid particles to adhere to each other and to form agglomerates. If the feed rate is too high, or if the coking reaction is too slow, sufficient agglomeration of the particles will occur to cause complete defluidization or bogging of the fluid bed. Bogging of the bed is one of the most serious problems encountered in operating fluid cokers. Thus it is of vital importance to be able to predict when bogging conditions are being approached so that suitable adjustments in operating conditions can be made.

It has been the practice to operate a coking process well on the safe side of conditions that cause bogging, i.e., at low feed rates, high temperatures, high solid circulation rates, etc. In this way, all of the feed is promptly evaporated and cracked and the tacky residue is spread over a large amount of the solids so that no substantial agglomeration takes place. Obviously, operating well on the safe side of bogging conditions severely limits the capacity of the coking system and is highly uneconomical.

If the simple expedient of resorting to higher temperatures is used to avoid bed bogging, then a loss in the quality of products is experienced. It is preferred to coke at temperatures below 1050° F., e.g., at 950° F. At these temperatures good product yields and distributions are obtained.

This invention provides a means for detecting the onset of bogging of the fluid bed whereby operations at maximum feed rates can be achieved. The invention is based upon the fact that the density of the fluid coking bed decreases as conditions of bogging are approached. Thus bogging can be predicted and avoided by proper adjustment of the operating conditions.

From experimental pilot plant operations, it has been determined that the fluidized density of the contact solids of the coking bed will decrease:

(1) As the superficial fluidizing gas velocity increases.
(2) As the liquid content of the contact solids increases which may be caused by several factors.

For example, as the coking temperature decreases while feed is being injected, the liquid content will increase because of the lower coking reaction rate.

(3) If the median particle size of the contact solids decreases.

Thus, if the gas velocity and particle size of the solids are maintained constant, the density of the fluidized solids is indicative of the liquid content of the solids which is the principal factor leading to bogging.

The present invention proposes to measure the oil or liquid content of the solids and the approach to bogging by measuring the differential density of fluidized solids between liquid-containing solids in the coking zone and dry fluidized solids in a separate zone which serve as a standard.

Reference to the attached drawing will serve to make this invention clear. The drawing illustrates a preferred modification of this invention and is presented for purposes of illustration only.

Illustrated by the drawing is a fluid coking vessel 1 for pyrolytically converting heavy oils. A fluid bed of solids, e.g., coke of 40 to 1000 microns in size, having an upper level L is maintained in the vessel by admitting a fluidizing gas, e.g., steam, to the base of the vessel by line 2 in amounts sufficient to obtain superficial fluidizing gas velocities in the coker in the range of 0.5 to 4 ft./sec. Coke at a temperature 100 to 300° F. above the coking temperature is admitted to the coker by line 3 in amounts sufficient to maintain a coking temperature in the range of 900° to 1200° F. The lower portion of the coker serves as a stripping zone to remove occluded hydrocarbons from the coke. Coke is withdrawn from this stripping zone by line 4 and is circulated to an external heating zone to be reheated.

The feed, e.g., a residual oil, is injected into the coker via line 5. Vaporous conversion products are removed overhead by line 6 as product after having entrained solids removed by cyclone system 7.

To anticipate the onset of bogging, a small external fluidizing vessel or pipe 8 having a relatively large length to diameter ratio is connected to the coker at its upper end. A portion of the heated solids admitted to the coker are supplied by line 9 to line 8 at a rate sufficient to achieve a small upward flow of solids through line 8 into the coker. Fluidizing gas, e.g., steam, nitrogen, or carbon dioxide, is admitted to the base of line 8 by line 10 in amounts sufficient to obtain fluidizing gas velocities in line 8 that are equivalent to the fluidizing gas velocity in the coking bed. In this manner the solids in line 8 have the same particle size as the solids in the coking zone and are fluidized at the same velocity. The solids in line 8 have, however, a greater fluidized density than the solids in the coker. The lower density of the fluidized solids in the reaction vessel is accounted for by the oil content of the solids contained therein.

A pressure tap 11 is connected to the coker at point A, and another pressure tap 12 is connected to line 8 at point B which is approximately at the same elevation as A. Both taps connect with a pressure differential indicating means 13. The pressure differential so obtained is indicative of the difference in density of the solids in the two vessels. Because the solids at B are known to be dry, this differential is indicative of the liquid content of the solids at A.

When the pressure differential indicates that the liquid content of solids in the coker is near that which causes bogging, or when it significantly increases because of upset conditions, then a proper adjustment in operating conditions can be made to avoid this difficulty by decreasing the liquid content of the solids. For example, when the pressure differential exceeds an empirically predetermined value, the feed rate may be decreased, the coking temperature increased, the solids circulation rate increased, or the fluidization gas rate increased. It can be seen that this measuring means compensates for changes in particle size of the solids, and because the solids are dry, gives a standard for measuring the liquid content of solids in the coker.

*Example*

A fluid coker contains 300 tons of particulate coke of a particle size in a range of 40 to 800 microns, 250 microns median particle size. The bed is maintained at a temperature of 950° F. Steam is admitted to the base of the vessel in amounts sufficient to maintain a superficial fluidizing gas velocity of 1.5 ft./sec. The fluid bed has a total height of 63 ft. The pressure above the fluid bed is 6 p.s.i. The fluidized density of the solids without feed being introduced into the bed is 45 lbs. cu. ft. A 2 inch I.D. external vertical pipe is connected to the coker 20 ft. below the top of the bed and extends 40 ft. downwardly therefrom. 175 lbs./hr. of freshly heated solids are introduced into the external pipe 10 ft. above the bottom. Steam is introduced into the vertical pipe to serve as a fluidizing gas therein at a rate sufficient to match the velocity in the main coker, 1.5 f./s. The solids in the vertical pipe have an average temperature of 1100° F. A pressure tap (point B) is located in the vertical pipe 8 ft. above the bottom and a corresponding pressure tap (point A) is located on the coker at the same elevation.

A residual oil of a gravity of 4.2° API, an initial boiling point of 1000° F., and a 24 wt. percent Conradson carbon is injected into the fluid bed at a rate of 0.5 lbs./lb. of solids. Heated solids at a temperature of 1125° F. are supplied to the coker at a rate of 26 tons/min. to maintain the coking temperature.

Upon the injection of the feed, the fluid coking bed density decreases to an average density of about 37 lbs. cu. ft. The difference in pressure between points A and B is 1.70 p.s.i.

It has been empirically found for this particular coking apparatus and these coking conditions that if this pressure differential increases to about 3.1 p.s.i., because of an increase in feed rate or change in the nature of the feed, for example, the concentration of liquid on the solids is too high and bed bogging is eminent. Thus when the pressure differential exceeds this predetermined value of 3.1 p.s.i. for the above described equipment, corrective action is taken, such as decreasing the feed rate, to avoid bed bogging.

The measuring means proposed by this invention can be used simply to indicate an upset in operating conditions, i.e., in many cases it will be sufficient to have the indication of change obtained by this measuring means serve only to alert the operator to a change in conditions. It can be used in its simpler form to operate an alarm, and can be either operated manually or automatically.

If knowledge of the actual liquid contact of the solids, or of the relative proximity of bogging is desired, then the measuring means can be calibrated. For example, calibration of the measuring means can be accomplished by pilot plant tests to determine at what pressure differentials at different operating temperatures bogging will occur for a particular coking apparatus. If so calibrated, the measuring means can be suitably instrumented to supply the control response necessary to avoid bogging. For example, increases in the pressure differential obtained by the measuring means can serve by suitable instrumentation to decrease the oil feed rate.

Modifications of this invention will be apparent to those skilled in the art. To assure that solids in the vertical pipe have the same size as the solids in the coking bed, and to avoid any classification of solids in the pipe, a small amount of solids can be removed from the base of the pipe via valve 15 and line 14. These solids may be withdrawn from the process as product or returned to the coking bed. In another modification, the addition of hot solids can be dispensed with while solids are withdrawn from the base of the elongated pipe and the mass flow rate of solids entering the top of the vertical pipe from the coking bed is adjusted to a low value so that the solids will be coked dry in the upper portion of the pipe. In some applications, it may be desirable to have all or part of the measuring means located within the coking vessel. More than one measuring means can be used to determine conditions in different parts of the bed.

In summary, it can be seen that this invention proposes a method of determining a change in the liquid content of particulate contact solids in the fluid coking bed of a hydrocarbon oil fluid coking process. The method comprises maintaining a column of fluidized dry particulate solids in an external elongated vertical zone as a standard of reference. The upper portion of the external zone is in fluid communication with the upper portion of the fluid coking bed. The particle size and particle size distribution of the dry particulate solids in the external zone are maintained substantially the same as that of the contact solids in the fluid coking bed and the external column of solids is fluidized at approximately the same fluidizing gas velocity as used in the fluid coking bed. The pressure differential is then measured between a point in the lower portion of the external column of fluidized solids and a point of substantially the same elevation in the fluid coking bed. With this arrangement, a change in the pressure differential obtained is indicative of a change in the liquid content of the solids in the fluid coking bed.

Having described the invention and a preferred modification, what is sought to be protected by Letters Patent is succinctly set forth in the following claims.

What is claimed is:

1. An improved process for coking heavy oils which comprises contacting a heavy oil at a coking temperature with a coking bed of fluidized solids whereby said heavy oil is converted to vapors and residue which is deposited on said solids, removing said vapors overhead as product, maintaining a fluidized column of said solids in a dry condition in an external, elongated vertical zone, said dry solids having been heated to a temperature above the coking temperature in an external heating zone, the top portion of said fluidized column being in fluid communication with the upper portion of said coking bed, determining the pressure differential between the fluidized solids of said coking bed and of said external fluidized column at points of substantially the same elevation, and restricting the concentration of liquid on the solids of said coking bed by increasing the severity of the operation when said pressure differential increases above a predetermined amount, whereby bed bogging is avoided.

2. The process of claim 1 wherein said coking temperature is in the range of 900° to 1200° F. and wherein said concentration of liquid on the solids is decreased by raising the coking temperature within this restricted range.

3. The process of claim 1 wherein heated, dry solids are continuously admitted to the lower portion of said external fluidized column and there is a net upward flow of solids in said column.

4. The process of claim 1 wherein a small amount of solids is continuously removed from the base of said external fluidized column.

5. A method of determining a change in the liquid content of particulate contact solids in the fluid coking bed of a hydrocarbon oil fluid coking process, which comprises maintaining a column of fluidized dry particulate solids in an external elongated vertical zone as a standard of reference, said dry solids having been heated to a temperature above the coking temperature in an external heating zone, said external elongated zone being in fluid communication with the upper portion of said fluid coking bed, maintaining the particle size and particle size distribution of said dry particulate solids in said column substantially the same as said particulate contact solids in said fluidized coking bed, fluidizing said column of solids with substantially the same fluidizing gas velocity as used in said fluid coking bed, and measuring the pressure differential between a point in the lower portion of said column and a point of substantially the same elevation in said fluid coking bed, a change of said pressure differential being indicative of said change in liquid content of contact solids in said fluid coking bed.

6. An improved process for coking heavy oils which comprises contacting a heavy oil at a coking temperature with a coking bed of fluidized solids whereby said heavy oil is converted to vapors and residue which is deposited on said solids, removing said vapors overhead as product, maintaining a fluidized column of said solids in a dry condition in an external, elongated vertical zone, said dry solids having been heated to a temperature above the coking temperature in an external heating zone, the top portion of said fluidized column being in fluid communication with the upper portion of said coking bed, determining the pressure differential between the fluidized solids of said coking bed and of said external fluidized column at points of substantially the same elevation, and decreasing the concentration of liquid on the solids of said coking bed by decreasing the oil feed rate when said pressure differential increases above a predetermined amount, whereby bed bogging is avoided.

References Cited in the file of this patent

UNITED STATES PATENTS

| | | |
|---|---|---|
| 2,420,129 | Flock | May 6, 1947 |
| 2,429,545 | Bergstrom | Oct. 21, 1947 |
| 2,465,628 | Border | Mar. 29, 1949 |
| 2,709,676 | Krebs | May 31, 1955 |
| 2,788,312 | Moser | Apr. 9, 1957 |